United States Patent [19]

Blevins et al.

[11] Patent Number: 4,529,019

[45] Date of Patent: Jul. 16, 1985

[54] SAFE TIRE INFLATOR

[75] Inventors: Daniel W. Blevins; Robert W. Adelman, both of New Castle County, Del.

[73] Assignee: The Crowell Corporation, Newport, Del.

[21] Appl. No.: 523,900

[22] Filed: Aug. 16, 1983

Related U.S. Application Data

[63] Continuation-in-part of Ser. No. 514,533, Jul. 18, 1983, Pat. No. 4,505,309, and a continuation of Ser. No. 355,876, Mar. 8, 1982, abandoned, said Ser. No. 514,533, is a continuation of Ser. No. 287,556, Jul. 28, 1981, abandoned, and a continuation-in-part of Ser. No. 264,196, May 15, 1981, Pat. No. 4,410,021.

[51] Int. Cl.³ .............................................. B65B 3/04
[52] U.S. Cl. ........................................ 141/94; 141/65; 141/97; 141/98; 141/114; 157/1
[58] Field of Search ................ 141/1, 10, 38, 67, 68, 141/83, 94–98, 114, 313–317, 65, 66, 382, 279; 49/68; 137/223, 227; 152/415; 70/1; 157/1

[56] References Cited

U.S. PATENT DOCUMENTS

| | | | |
|---|---|---|---|
| 870,103 | 11/1907 | Higginson | 141/97 |
| 1,387,549 | 8/1921 | Lungren | 206/522 |
| 1,784,366 | 12/1930 | Littlefield | 206/69 |
| 2,407,049 | 9/1946 | Winarsky et al. | 157/1 |
| 2,571,302 | 10/1951 | Smith | 141/97 |
| 2,784,776 | 3/1957 | Wentzien et al. | 157/1 |
| 2,792,056 | 5/1957 | Ricketts et al. | 157/1 |
| 2,960,130 | 11/1960 | Smyser | 157/1 |
| 3,319,687 | 5/1967 | Tomchak | 206/304 |
| 3,495,647 | 2/1970 | Branick | 157/1 |
| 3,648,613 | 3/1972 | Cunn | 102/22 |
| 3,721,201 | 3/1973 | Boller | 109/49.5 |
| 3,817,299 | 6/1974 | Koeler | 141/97 |
| 4,036,274 | 7/1977 | Peel | 157/1 |
| 4,057,093 | 11/1977 | Joines | 157/1 |
| 4,248,342 | 2/1981 | King et al. | 206/3 |
| 4,291,500 | 9/1981 | Reckin et al. | 49/68 |
| 4,347,796 | 9/1982 | King et al. | 109/49.5 |

FOREIGN PATENT DOCUMENTS

| | | | |
|---|---|---|---|
| 1605618 | 1/1970 | Fed. Rep. of Germany . | |
| 172025 | 6/1922 | United Kingdom | 206/304 |

Primary Examiner—Houston S. Bell, Jr.
Attorney, Agent, or Firm—Connolly & Hutz

[57] ABSTRACT

Vehicular tires, mounted on wheel rims, are more safely inflated in rugged box enclosing entire tire-and-wheel-rim assembly, using inflating line that penetrates through wall of box, with pressure gauge visible from outside of box. Interlocks can be provided to help assure that box must be closed before inflation can be started, and that box cannot be opened for 3 to 10 minutes after inflation is completed. Window can be provided for visually inspecting tire-and-wheel-rim assembly during or after inflation, and deflation valve permits deflation if the inflation appears unsafe. Box can have welded-on re-enforcements.

31 Claims, 7 Drawing Figures

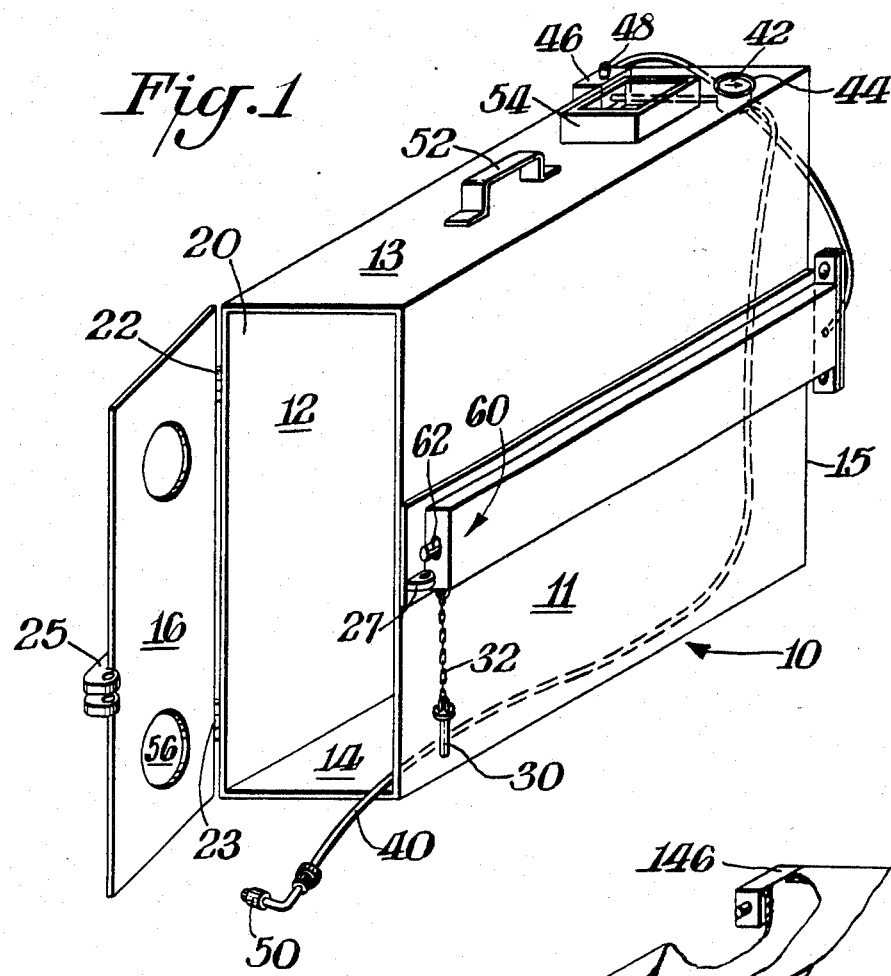
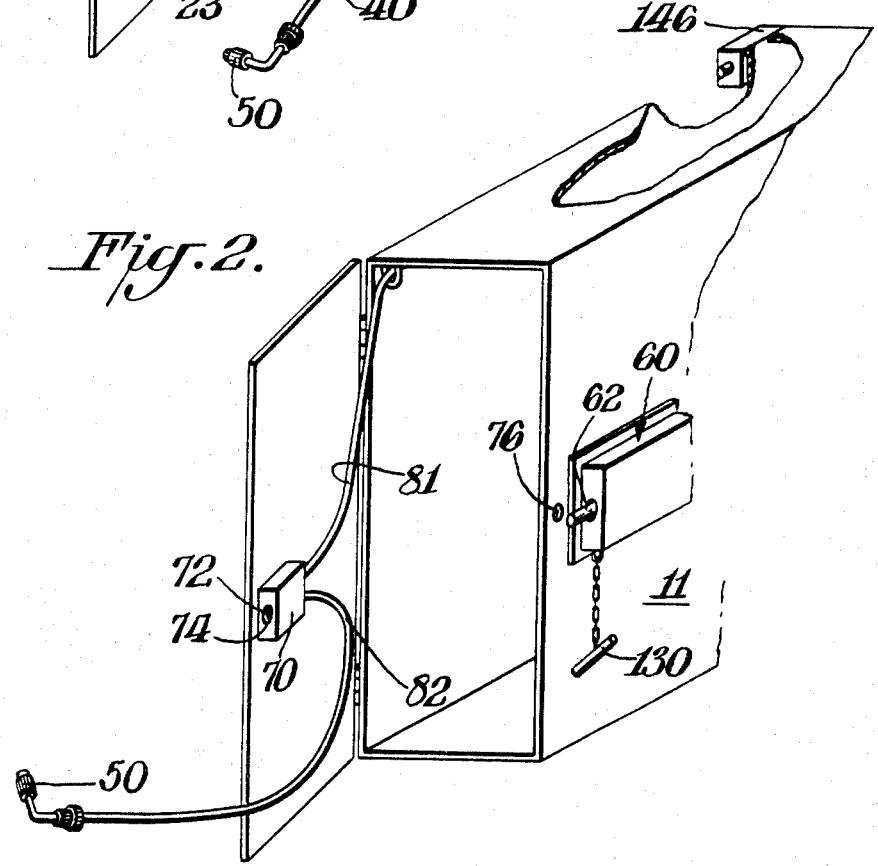

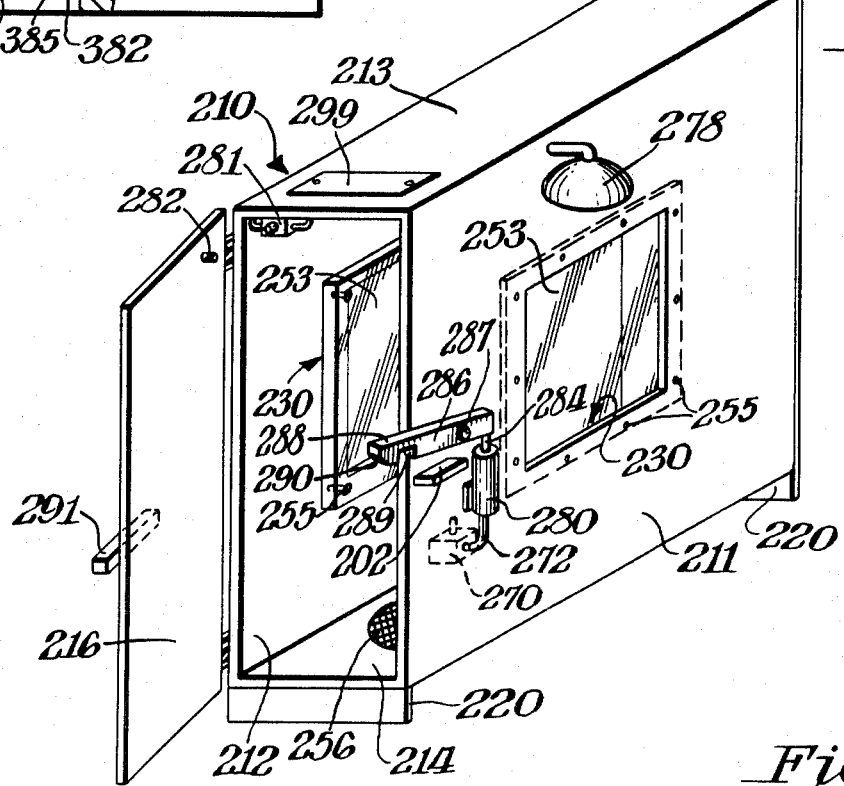

SAFE TIRE INFLATOR

This application is a continuation of application Ser. No. 355,876 filed Mar. 8, 1982 (subsequently abandoned), and a continuation-in-part of applications Ser. No. 264,196 filed May 15, 1981 (now U.S. Pat. No. 4,410,021) and Ser. No. 514,533 filed July 18, 1983 (now U.S. Pat. No. 4,505,309). The last-mentioned application is in turn a continuation of application Ser. No. 287,556 filed July 28, 1981 (subsequently abandoned) as well as a continuation-in-part of said application Ser. No. 264,196.

The present invention relates to the inflation of vehicular tires, more particularly to the inflation of tires that can cause considerable damage when something goes wrong.

Among the objects of the present invention is the provision of novel apparatus for relatively safe inflation of tires.

Additional objects of the present invention include novel techniques for relatively safely inflating tires while they are mounted on wheel rims that may have un-noticed defects.

The foregoing as well as still further objects of the present invention will be more fully explained in the following description of several of its exemplifications, reference being made to the accompanying drawings, wherein:

FIG. 1 is an isometric view of an inflating apparatus representative of the present invention;

FIGS. 2 and 3 are similar views of modified constructions typical of the present invention;

FIG. 4 is a schematic representation of an air-supply circuit particularly suited for the present invention;

FIG. 5 is a detail view partly in section of a further modified construction of the present invention;

FIG. 6 is a sectional view of an inflation actuating control desirable for use with the present invention.

Figure 7:
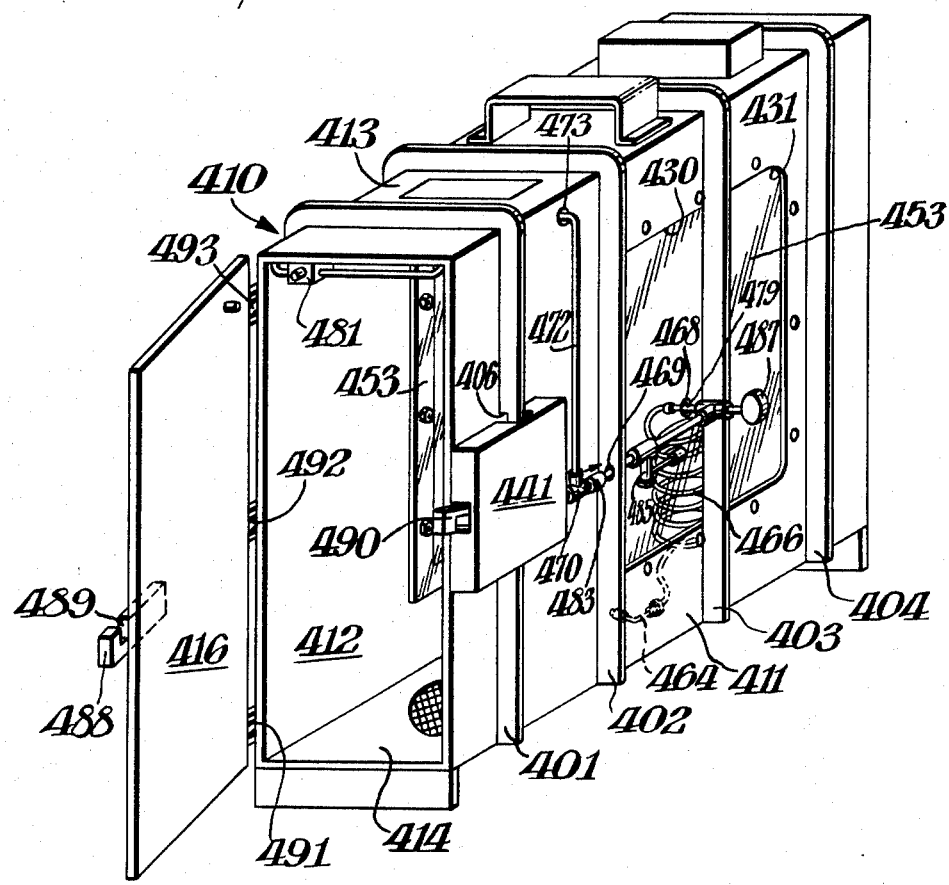
FIG. 7 is a view like FIG. 3 of a still further modified construction of the present invention.

According to the present invention, an apparatus for relatively safely inflating pneumatic tires on vehicular wheel rims, comprises a box that receives a tire-carrying wheel rim, the box having walls surrounding all sides, top and bottom of the tire-carrying wheel rim, the walls being sufficiently strong and securely held to contain all tire and wheel parts in the event the tire explodes, one wall of the box being openable to permit the introduction and the removal of the tire-carrying wheel rim, a flexible air conduit within the box having an outlet connector that can be clamped to a tire valve stem, the air conduit having linking means penetrating through a wall of the box to a valved supply line outside the box, and a pressure indicator visible from outside the box and connected to the flexible air conduit to indicate the pressure in the tire.

The box is conveniently made of ¼ inch thick steel plates welded together, although thicker plates can also be used. It is also helpful for the box not to be airtight but to contain leak gaps that permit the harmless escape of air from the box, in the event a tire in the box explodes. A total leakage through at least about 20 square inches effective leak cross-section is preferred.

Turning now to the drawings, FIG. 1 shows a box 10 made of steel plates 11, 12, 13, 14, 15 and 16, each about ¼ inch thick. Side plates 11, 12 are welded to top and bottom plates 13, 14, and to a rear plate 15 to form an open box large enough to receive a wheel-rim-mounted truck tire. The interior of this box can be 4 feet high, 4 feet deep and about 14 inches wide, so that most truck tires can be easily rolled in through its open mouth 20. Truck tires are the type of tire most likely to explode, as for example because of an unnoticed crack or failure of the wheel rim on which they are being inflated. Improper mounting of the tire on the rim can also lead to such explosions.

Mouth 20 can then be closed by door plate 16, which is shown pivotally mounted on hinges 22, 23 securely fitted to plate 16 and to side plate 12. The door plate also carries a forked pair of rings 25 that become aligned with a pintle ring 27 welded to plate 11, when the door is closed. The door can then be locked in closed position by inserting a pintle pin 30 downwardly through the aligned rings. Pin 30 is shown as carried by a chain 32 anchored to plate 11, so that it does not get lost.

Within box 10 is a flexible compressed air conduit 40 of the type used to inflate tires. This conduit leads to a pressure gauge 42 mounted against the inner surface of plate 15 but having its face exposed through an opening 44 cut in plate 13. The pressure gauge leads in turn to a control valve 46, by means of a short length of pipe, not shown, that penetrates through a hole in plate 12. A compressed air supply line runs from valve 46 to a compressor or other source of compressed air, and a control button 48 is shown on control valve 46 to turn on and off the flow of compressed air to conduit 40. That conduit can be fitted with a clamp-on fitting 50 that removably clamps onto a tire valve stem to make an air-tight connection to the interior of the tire.

Box 10 is also shown as having a lifting strap 52 welded to the top of plate 13 so that the box can be conveniently lifted and lowered to move it to any desired location. Also an open container 54 can be secured to plate 13 or any of the adjoining plates 11, 12 or 15, to hold tire lubricant, or spare fittings or the like, that may be helpful for use when mounting or inflating a tire.

Air conduit 40 can desirably be made relatively short in length, so that it does not have a long projection that must be stuffed into the box with a tire and wheel assembly, and there is accordingly less danger of the conduit becoming pinched or kinked. Also a short conduit projection makes it easier to first roll a wheel and tire assembly part way into the box, then clamp the conduit to the tire valve stem, and finally roll the wheel and tire assembly with the conduit attached, all the way into the box. The door panel can then be closed, pinned, and the tire inflated.

In addition it becomes difficult or impossible to mount a short conduit 40 onto a tire valve stem unless the tire is partly rolled into the box.

Door panel 16 need not be closely fitted with respect to the mouth of the box. A gap of 1/16 inch all around that panel is actually helpful in that it permits the harmless escape of compressed air in the event a tire bursts while in the box. One or more openings 56 can also or alternatively be provided in the cover panel to permit further air escape, if desired.

Some tire explosions have been reported as taking place several minutes after completing inflation. It is accordingly desirable to wait five to ten minutes after completing an inflation, before opening the door panel and removing the inflated tire. To assure such a delay, the box can be equipped with an automatic lock that prevents premature opening.

In FIG. 1 a precautionary interlock assembly 60 is welded onto the exterior of side plate 11 and holds an interlock nose 62 above pintle ring 27 in the path of pin 30 as it is inserted in or removed from pinning engagement with the rings 25 of the door panel. Nose 62 is carried by the piston of an air cylinder that extends through the interior of the interlock assembly to the rear panel 15 where it is connected to receive air from the compressed air supply when valve 46 is actuated. Upon such activation the air cylinder will force nose 62 into the blocking position shown, and thus keep a previously inserted pin from being withdrawn.

Valve 46 can be of the type that when it shuts off the delivery of compressed air it automatically bleeds out to the atmosphere the air downstream of the valve. In the FIG. 1 construction valve 46 has two branched downstream lines, one to conduit 40 and the other to precautionary interlock 60. The branch to conduit 40 is fitted with a check valve to prevent the automatic bleeding, but the line to the interlock assembly is permitted to bleed. The bleeding rate is fixed at a value that requires 5 to 10 or more minutes before the interlock cylinder air pressure is low enough to allow nose 62 to be withdrawn or pushed away from pin-blocking position. The pin 30 can then be removed, the door panel opened, and the inflated tire rolled out of the box.

FIG. 2 shows a modified construction in which the interlock also helps assure that the door panel must be closed before inflation can be effected. Here an auxiliary control valve 70 has an actuating button 72 deeply recessed in the interior of guide passageway 74, and located on the door panel so that closing of that panel brings passageway 74 into alignment with a pin-receiving aperture 76 in side panel 11.

Valve 70 has two air lines 81, 82, one going to a main control valve 146 and the other to valve stem clamp 50. When the door panel is closed, interlock nose 62 can be pushed in and pin 130 then inserted through aperture 76 and guide passageway 74. Control button 72 can be strongly spring loaded so that considerable force is needed to cause pin 130 to actuate the valve. Nose 62 can then be pulled out to hold pin 130 in actuating position. Inflation can now be effected, after which the nose 62 can be again pushed out of the way once the time-delayed bleeding is completed.

The air cylinder in interlock 60 can be replaced by a rubber bladder that is inflated by the compressed air and presses against a loosely fitted vertically positioned internal plate on which nose 62 is mounted. The bleed opening need only be about a 5 mil wide hole, when the total volume of air to be bled is about 2 liters. Preferably a wire is inserted through the bleed hole and loosely held there so that it can jiggle and keep the hole from becoming clogged with dust or the like.

Holes 56 can be cut through the bottom plate 14, instead of the door plate, in which event it is helpful to have the box floor a little above the ground, as by welding skid strips or short feet to the outside of the box. Such holes can be covered with heavy wire mesh to keep conduit 40 from getting trapped in them.

In FIG. 2 the main control valve 146 has its actuating button positioned on a vertical face, so that the button is pushed in a horizontal direction to trigger the inflation. This makes it difficult to defeat the need to manually operate the valve, an undesirable technique that could be effected as by placing a weight on its actuating button to hold it down. If desired that button can be located on the under surface of the control valve.

The precautionary interlock can be provided in other ways. Thus electrical micro-switches can be mounted on the door panel of the construction of FIG. 2, one to be actuated when the door panel is closed and another when the pin 130 is moved into door-locking position. These switches can be wired in series with each other and in series with a main electrical switch that starts a compressor which furnishes the compressed air to flexible line 40. That main switch can be located at 146 and can also be separately connected to a solenoid that brings interlock nose 62 into locking position and latches it in that position. A timer is also started when the main switch is disengaged and the timing out of the timer unlatches the solenoid.

Alternatively, the flexible air conduit 40 can include a make-and-break push-pull connector consisting of two separable parts one of which is mounted on the door panel and the other of which is mounted on the outside of panel 11. When the door panel is closed it carries its part of the connector into engagement with the part on panel 11, and in this way establishes the compressed air path to a portion of air conduit 40 that extends through an opening in the door panel and into the interior of the box.

Opening the door panel, then opens the make-and-break connection so that no compressed air can reach the tire valve. The parts of the make-and-break connector can also be arranged to lock together when their interiors are subjected to superatmospheric pressure, to thus lock the door in closed position. This can be effected by making the make-and-break connection between a rubber male connector that expands when its interior is under pressure, and a relatively rigid female connector that receives the male connector and has a tapered internal bore that hold the male connector in place when the male connector is expanded.

A bleed hole can be used to bleed the pressurized air out of the make-and-break connector over the desired time period. A check valve downstream of the make-and-break connector prevents bleeding of the air from the inflated tire.

The boxes of the present invention can be larger or smaller than indicated in the dimensions given above, and can be made to fix any tire.

To prevent misoperation, filters can be installed in the air lines, particularly just upstream of an air cylinder, or upstream of the main valve, to trap dust and other particles and thus keep them from getting into critical places.

The construction of FIG. 3 has a box 210 similar to those of FIGS. 1 and 2, but with a viewing window 230 in each of the box's side panels 211, 212. Each window is cut out of its panel and covered with a transparent sheet 253 of a thick, tough plastic such as polycarbonate. The sheet is illustrated as mounted against the inner face of its panel, and held by flat head screws 255 recessed in the sheet and threaded directly into threaded openings in the panel. If desired one or both plastic sheets can be fitted to the exterior faces of their panels, in which event the sheets can be made thicker and can be fastened with more fasteners. These sheets are thick enough to withstand the force of a tire explosion that takes place inside the box, and a thickness of about $\frac{1}{2}$ inch or a little more is suitable for this purpose.

Box 210 has vent openings 256 in its floor panel, but they can alternatively or additionally be in the top panel 213. These vent openings are spanned by spaced metal straps welded in place to make sure anything escaping through a vent is quite small in size, and also to prevent passing through the vent the air line used for inflating. This makes it more difficult to use that line for inflating a tire without fitting the tire inside the box.

The inflating line is not shown in FIG. 3, but is connected to one branch of a junction block 270 having another branch connected to the input line 272 of an air cylinder. A third branch of the junction block is connected by pipe or flexible tubing to an interlock valve 281 mounted in the mouth of the box for activation by a post or plunger 282 carried by door 216. Valve 281 is normally closed, but is opened when door 216 is closed, so that the air will not reach the junction block unless that door is closed.

The construction of FIG. 3 is also fitted with two more valves, one a normally closed main inflating valve connected between the intake of the interlock valve 281 and the compressed air supply, and the other connected to act as a discharge for deflating the tire. The inflating valve is placed as in FIGS. 1 or 2, sufficiently far from the interlock valve to make it impossible for one person to manually open both of these valves simultaneously.

The discharge valve is opened when a tire under inflation is to be deflated, such as when it is noticed through a window 230 that the tire and/or wheel rim has not been properly mounted or there is some defect or failure that renders the inflation unsafe. To help examine for such problems one or more electric lights 278 can be fitted above or around the outer face of each window, or inside the corners of the box.

The inflating, deflating and interlock valves can be of identical construction, such as Schrader poppet valve 7796SP5 shown in Schrader Fluid Power Division Catalog VAL-1 (Rev.10/76).

Air cylinder 280 is secured to the outer face of panel 211 to hold a piston rod 284 up against the bottom of one end of a latch lever 286. That lever is pivoted on a pin 287 secured to panel 211, so that the opposite end 288 of the latch lever projects forwardly beyond the open mouth of the box. That projecting end has a locking notch 289 in its lower portion, and also has a latching nose cam 290. These coact with a latch bar 291 welded to the door 216. When that door is being closed with the air cylinder not inflated, the bar 291 first engages the nose cam 290 to thus tilt up the latch lever end 288. Further closing movement brings bar 291 under locking notch 289 permitting the latch lever end 288 to drop over the bar and lock the door in a closed position.

The closing of the door automatically opens interlock valve 281, and the actuation of the inflating valve then inflates the tire and wheel previously inserted into the box as described in connection with FIG. 1. Such inflation also inflates air cylinder 280 forcing rod 284 up against the rear of latch lever 286 securely holding it in door-locking position. A rest or stop bar 202 can be provided to keep the latch lever 286 from tilting down below latching position.

A preferred air line system is shown in FIG. 4. The compressed air supply runs from intake 241 of inflating valve 242 through that valve, then through connector 243, through interlock valve 281 and connector 244 to air cylinder 280. A check valve 292 branches from connector 244 and in turn connects to tire connector 250. Deflating valve 283 has its intake 293 opening into tire connector 250. A bleed 294 opens into connector 244 to gradually bleed out compressed air from cylinder 280 when inflation is completed. Check valve 292 is polarized to confine such bleeding to its air cylinder side, and the bleeding is adjusted, as pointed out above, to keep the latch lever in door-locking position for 5 to 10 minutes or more, before the pressure in the air cylinder drops to a level that permits unlocking of the latch lever. As litle as ¼ minute or even 3 to 4 minutes delay is helpful in reducing the possibility of injury from delayed tire bursting.

It will be noted that when deflating valve 283 is actuated to deflate an inflated or partially inflated tire, the air cylinder is also deflated so that the deflated tire can be immediately removed from the box without waiting the length of time required for the slow bleeding. A restriction can be inserted in the line through which the cylinder thus deflates, or can be built into check valve 292, to help assure that the cylinder deflation is not completed much before the tire deflation.

If desired a normally open manually-operated shut-off valve can be inserted in the connection between bleed 294 and junction box 270, and its operator can be ganged with the operator of inflating valve 242, so that when the inflating valve is opened to inflate a tire, the bleed passageway is closed and no bleeding takes place. This speeds the tire inflation step.

Valves 242 and 283 can be solenoid-operated if desired, in which event valve 281 can be replaced by an electric circuit interlock switch, and connecting lines 243, 244 permanently open to each other. Such an interlock switch can be normally open but connected to switch to circuit-closing position and thus automatically actuate the inflating valve when door 216 is closed, and can be so heavily spring-biased toward open-circuit position that it takes the mechanical leverage provided by door 216 to switch it to circuit-closing position. When valve 281 is used it can similarly be heavily biased to closed position.

The use of electrical valve operation requires an electric power supply line in addition to an air supply line, but so does the use of lights 278. In addition an electric supply circuit can be readily fitted with a relay-operated warning light or alarm located at a supervisor's station, to show that the inspection lights 278 are not operating or that no electric power is being consumed. This will help guard against misoperating the apparatus, and will also show the unit is in use.

To prevent an operator from using the unit without electrical power, a normally closed electric solenoid can be placed in the air supply line.

The construction of FIG. 3 also has feet 220 holding the bottom panel 214 of the box a little above the floor on which the box stands. Rear foot 220 can merely be an extension of the rear panel of the box, and front foot 220 can be a narrow length of plate welded to the bottom panel 214.

FIG. 5 is a view from below of a box similar to those of FIGS. 1, 2 and 3, partly sectioned to show a modified construction for inspection windows 350. This window construction has a plate 353 of transparent plastic fitted across an opening 351 in box 310 as in the construction of FIG. 3. However, in FIG. 5 the plastic plate is re-enforced by a series of spaced bars 360 extending across the opening 351 and welded to the box, or to a metal frame 354, at both ends. In addition the bars 360 have their ends notched out so as to provide a longitudinal face 361 that engages the outer face of the plastic plate.

Bars 360 have horizontal widths that can be as much as an inch so as to provide rugged stiffening of the box as well as a tremendous support for the plate. The vertical depth of bar 360 can be as little as ¼ to ⅜ inch, and they can be spaced from each other by 1½ to 3 inches, so as to not interfere too much with visual inspection through the window. The re-enforcing bars 360 can be aligned so that they point toward any light or lights mounted on the exterior of the box and thus obstruct such lighting as little as possible.

Frame 354 can be used to support a plastic plate so that the inner surface 355 of the plate is flush with, or recessed outwardly with respect to, the inner face of the box panel in which the window is fitted. This reduces the scratching of plastic face 355 by the tire or wheel rim, or tire connector, and thus prolongs the life of a plastic plate. It is preferred to use tire connectors that project as little as possible toward the windows. Connectors numbered 5449K61 or 5449K62 described on page 1692 of McMaster-Carr Supply Company (New Brunswick, N.J.) catalog 87 copyrighted 1981, are of this preferred type.

The inspection windows can be made circular or oval or of any other outline. Rectangular openings are simpler to fit with re-enforcing bars 360 inasmuch as all such bars for one window can then be made identical to each other.

FIG. 5 also shows an inflating valve 242 and a deflating valve 283 mounted on the box panel opposite door 216 and having their control buttons 302, 303 projecting downwardly so that they have to be pushed upwardly to be actuated. A pressure gauge 342 is also shown in FIG. 5 as connected in such a way that only a small perforation is needed in the box panel to receive the shank 343 of the pressure gauge. the entire face portion of the gauge is accordingly outside the box.

FIG. 6 illustrates a modified valve 380 built into a metal block 381 having a recess 382 in its lower face. The valve mechanism 383 is fitted to one end of the block and has an actuating button 384 in a bore 385 that opens into recess 382. Button 384 can be actuated by inserting one's finger into recess 382 and then bending the finger so that the fingertip engages button 384, after which the fingertip can be pushed against the button to move the button deeper in its bore. The wall 387 of recess 382 flares outwardly in a downward direction so as to make it difficult to wedge any member inside the recess for the purpose of attempting to hold the button 384 actuated without the use of one's hands.

The construction of FIG. 6 is particularly desirable if it is important to avoid tempting an operator to misuse the apparatus.

The apparatus of the present invention is also desirably fitted with a warning or record that contains instructions for its use. Thus a plate 299 can be mounted on its top panel for example as shown in FIG. 3, to carry a warning as to the maximum air pressure to be used, and also a place in which can be inscribed the number of tire explosions that the box can be expected to safely withstand. Space can be provided for scratching into the plate 299 a smaller number after each explosion it lives through, so that the box can be withdrawn from service after its safe life has been exhausted.

All fittings for the box are best protected against tampering; thus air cylinder 280 and its intake line 272 can be covered by a rugged metal shield welded to the outside of panel 211. A similar shield can be fitted around and over pressure gauge 342 to help assure that it is not removed for the purpose of using its connection as a source of compressed air.

Inflating and deflating valves 242,243 can be combined into a single three-position valve. In one position the combined valve can then inflate both the tire and the air cylinder, while in another position both can be deflated. In a third position there is neither inflation or deflation. As noted above, a restrictor can be inserted in the deflation line from the air cylinder to make sure it does not become fully deflated much before the tire does. Alternatively a ballast tank can be connected to the air cylinder supply line to effectively increase the volume of air that must be deflated before the air cylinder permits unlatching of the door.

Such a three-way valve can be spring-biased toward the position in which there is no inflation or deflation, or it can be completely unbiased so as to remain in any position into which it is manually actuated.

The inflating and deflating control can be modified to use a standard quick-connect air supply connector as a control means. Such quick-connect connector is easily slipped into connecting engagement, and just as easily removed from connecting engagement. By having such engagement with a line that runs through a check valve to the air cylinder, and also with a branched line that runs through an on-off valve and through the door-interlock valve to the tire, no further mechanism is needed. Inflation is accomplished by attaching the air-supply connector which causes the air cylinder to become inflated, and actuating the on-off valve to on position to cause the tire also to be inflated. When the tire inflation is completed the on-off valve is returned to off position and the air-supply connector is removed. Such removal permits the air cylinder bleed to slowly deflate that cylinder, so that the inflated tire will not be prematurely removed from the protecting box. Also the tire can be deflated at any time after the air-supply connector is removed, by simply actuating the on-off valve to on position.

If desired the air-cylinder bleed can in the last-mentioned embodiment be built into the check valve, as by using a speed control valve of the type described on page 28 of the above-cited Schrader catalog. Such a valve has no actuator, permits full flow in one direction like an ordinary check valve, but only very limited flow in the opposite direction.

To reduce the danger of having one's finger caught under latch lever end 288 and abruptly pinched against latch bar 291, the air cylinder can be arranged to close the latch gradually. One simple way to accomplish this is to use a cylinder that has an exhaust outlet through which air is pushed out when the cylinder is being inflated, and sharply restricting the exhaust through that outlet.

A box as illustrated in FIG. 3 has withstood a number of test explosions induced by inflating large truck tires that had their side walls cut to induce blow-outs, or were mounted on multi-part rims incorrectly assembled. Some of the explosions took place at inflation pressures as high as 125 psig. Although the explosions generally cause a rim part to explode aginst a plastic window, the window did not break. On one occasion a small piece of the plastic was chipped off the edge of the window.

With unreenforced panel walls as thin as $\frac{1}{4}$ inch or less, an explosion at high pressure causes the side walls to bow out a little, particularly at the door opening. A little bowing of this nature does not disable the box, particularly where as in FIG. 3, the latch continues to operate even after the mouth of panel 211 bows enough to shift latch lever end 288 an inch or more toward the free end of latch bar 291. The thus-bowed box can generally be immediately re-used without the need for repairs. It is accordingly helpful to have the free end of latch bar 291 extend an extra inch or two beyong the latch lever. Other latches that tolerate such bowing can also be used. A bulged box can be readily straightened a number of times without seriously weakening it. To effect the straightening it is only necessary to apply a squeezing force to the opposing side panels of the box, to squeeze them toward each other. A heavy pipe clamp can be used for the squeezing.

Some explosions have caused the wheel rim to cut right through the air hose where that hose crosses past the edge of the wheel rim to reach the tire valve. This cutting is not necessarily undesirable, inasmuch as it automatically starts the deflation of the expanded tire tube. That tube does not necessarily burst when a wheel rim fails. Instead, separation of the rim cause the tube to expand under the influence of its internal pressure and fill the available space in the box. However, cutting of the hose can be prevented by providing it with a sturdy shield. Thus a reenforcing bar one to two inches deep can be welded to the interior of panel 211 from near the top to near the bottom of that panel and a slot or passageway cut through the bar to carry the inflating hose past it. An exploding rim will then strike the reenforcing bar instead of the hose.

Additional reenforcing bars can be welded to panel 211 as well as to opposing panel 212 to reduce the bulging effect of an explosion, and can similarly further protect the air hose from being pinched against the inside wall of the adjacent panel by an expanded tire. The reenforcing bars can be welded to the exterior of these panels instead of or in addition to their interiors. Thus a set of four spaced 1 inch by 2 inch reenforcing steel bars welded to the outside surface of panel 211 over its entire height will reduce to insignificance the bulging of that panel, and corresponding reenforcement can also be welded to the outside of opposite panel 212. Such reenforcement can also be applied across the width of the top panel. A box that has its sides heavily reenforced can have its metal walls somewhat reduced in thickness, to 3/16 inch for example.

The door of the box can also be arranged to help resist the bulging of the side panels. Thus the door can have about half-way up its height an extension such as the rings of FIG. 1, that engages the outside face of the side panel when the door is closed. Supplying the door with a sturdy hinge fixed to the opposite panel half-way up its height further improved the bulge resistance.

Block 270 of FIGS. 3 and 4 should be located where it is not damaged by an explosion. Thus it can be mounted as far as practicable from the wheel rim and can even be moved to the outer surface of panel 211.

FIG. 7 illustrates a tire inflating box or chamber 410 along the lines of the last mentioned modification. Box 410 is built very much like box 210, with transparent panels 453 secured to the inner faces of side walls 411, 412. In FIG. 7 the windows 430 cut out of the metal side panels 411, 412 have rounded corners 431 and each is spanned by one of four re-enforcing bars 401, 402, 403 and 404 welded to the external faces of those panels.

Side panel 411 carrying the latching mechanism, has that mechanism enclosed by a removable cover 441, and has its re-enforcing bar 401 notched out at 406 to make room for that mechanism. Air conduit 472 running to the latching mechanism is a metal pipe mounted on the outer face of panel 411 and penetrating through an opening 473 near the panel's top, to connect to interlock valve 481. The conduit from valve 481 to the main valve is also preferably metal pipe.

As pipe tee 470 connects pipe 472 to the latching mechanism as well as to inflation pipe 479 which runs to near the center of window panel 453. An opening 469 in re-enforcing bar 402 permits pipe 479 to run straight to another opening 468, this one in that window panel. At opening 468 pipe 479 enters the interior of the box, and within the box is fitted with a self-coiling, resilient, flexible conduit 466. The end of conduit 466 carries a tire-valve-clamping fitting 464.

The self-coiling conduit 466 is easily stretched out when it is to be clamped to a valve on a tire brought near the open box mouth. Then when the conduit-carrying tire is rolled into the box, the conduit coils itself and keeps itself generally out of the way so that it is not likely to be damaged by inflation explosions. Transparent windows 453 of ½ inch thick polycarbonate resin are not damaged by such explosions, notwithstanding the weakening effect of the opening 468.

A check valve 483 is preferably fitted between pipes 472 and 479 to permit air to flow to the tire, but preventing its flow in the reverse direction. Also a manually-operated vent valve 485 can be inserted in pipe 479 to permit the discharge of air from an inflated tire, if it is noted that there is an inflation problem. A pressure gauge 487 downstream of the vent valve enables the direct reading of the pressure in the tire, when operating the main valve at the rear of the box.

Box 410 has three hinges 491, 492, 493 for its door 416, and the door needs no further re-enforcement. Re-enforcing bars 401, 402, 403, 404 are shown as extending over top panel 413 of the box, but need not be, nor need they be welded to that top panel, although welding there provides an extra measure of safety. These re-enforcements can also be similarly extended around the box floor 414 if desired, and welded to that floor.

The transparent panels 453 can be further strengthened as by filling in the space between their outer faces and the nearby inner faces of the re-enforcing bars. Alternatively those bars can have offset central portions that rest against the outer faces of those panels.

Re-enforcing bar 401 or 404 can be omitted. Bars 402 can be welded to side panels 411, 412 directly over side edges of the window cutouts 430. Where bars 404 are used, they too can be welded directly over the window cutout edges.

Latch bar 488 can be notched as at 489, to receive the nose 490 of the latching lever when the door is closed, with the unlatched lever arranged to tilt upwardly by an amount that only clears the bottom of notch 489 by about ⅛ inch or less. This leaves no significant room for insertion of a person's finger where it might be injured by a forceful latch closing.

Obviously many modifications and variations of the present invention are possible in the light of the above teachings. It is therefore to be understood that within the scope of the appended claims the invention may be practiced otherwise than as specifically described.

We claim:

1. An apparatus for relatively safely inflating pneumatic tires on vehicular wheel rims, the apparatus being essentially a portable box that closely receives a truck-tire-carrying wheel rim, the box having walls surrounding all sides, top and bottom of the tire-carrying wheel rim, the walls being sufficiently strong and securely held to contain all tire and wheel parts in the event the tire or rim explodes, one wall of the box being a door openable to permit the introduction and the removal of the tire-carrying wheel rim, locking means on the box for locking the door in closed position, a flexible air conduit within the box and having an outlet connector that can be clamped to a tire valve stem, the air conduit having linking means penetrating through a wall of the box to a valved supply line outside the box, a pressure indicator visible from outside the box and connected to the flexible air conduit to indicate the pressure in the tire, and deflating means connected to the air conduit for deflating the tire when the inflation appears unsafe.

2. The apparatus of claim 1 in which the walls are made of steel at least ¼ inch thick, welded together, and the door is hinged.

3. The apparatus of claim 1 in which the box is not airtight but contains leak gaps that total at least about 20 square inches in effective cross section.

4. The apparatus of claim 1 in which the box has its interior about 4 feet high, about 4 feet deep and about 14 inches wide.

5. The apparatus of claim 1 in which the top wall of the box is fitted with a lifting strap.

6. The apparatus of claim 1 in which the outside of a wall is fitted with a container to hold the materials used in the mounting or inflating of a tire.

7. A tire-inflating-and-deflating apparatus having an enclosure for housing a pneumatic tire-and-wheel assembly, the enclosure containing a door movable between open and closed positions so that the tire-and-wheel assembly can be introduced into the housing when the door is in open position, locking means connected to lock the door in closed position when the locking means is actuated, compressed air means including an air conduit connected to selectively supply compressed air to the tire of the assembly while the assembly is in the enclosure and selectively remove compressed air from the tire when the tire is to be deflated while it is in the enclosure, control means connected to actuate the supply of compressed air to the tire to inflate it and to also automatically actuate the locking means to lock the door in closed position for a period of time longer than the duration of the inflation time, the compressed air means being further connected for actuation to remove compressed air from the tire and to also release the locking means over a time period which causes the door to become unlocked when the deflation is essentially completed.

8. The apparatus of claim 7 and further including interlock means interlocking the door with the compressed air means to prevent the supply of compressed air to the tire when the door is open, and establish the supply of compressed air to the tire when the door is closed.

9. The apparatus of claim 7 in which the box has an explosion-proof transparent panel through which the rim can be inspected while the tire is being inflated.

10. An apparatus for relatively safely pressurizing objects with compressed gas, the apparatus comprising an enclosure that receives an object to be pressurized, the enclosure being sufficiently strong and securely held as to prevent external damage in the event said object explodes, said enclosure having an entranceway which permits the introduction of said object, said entranceway having a door movable between an open and a closed position, said entranceway having locking means for locking said door in the closed position, compressed gas conduit means having a gas outlet connector that can be affixed to said object, compressed gas supply means in interruptible communication with said conduit means through precautionary interlock means that coact with said locking means and said conduit means to prevent the flow of gas from the compressed gas supply means to said object when the door is not in the closed position, and depressurization means connected to the gas conduit means for depressurizing said object when it appears that further pressurization would be unsafe.

11. The apparatus of claim 10 further characterized in that the enclosure takes the form of a box so sized as to closely fit a vehicular tire-and-wheel-rim assembly.

12. The apparatus of claim 10 further characterized in that said conduit means has a length short enough to require the said object to be partly inserted into the enclosure before the gas outlet connector can be affixed to said object.

13. The apparatus of claim 10 further characterized in that it includes a timed delay means coating with the conduit means and the locking means, such that the door may not be opened for a predetermined period of time after the pressurization of the object has been completed.

14. The apparatus of claim 13 further characterized in that the time delay means coacts with the conduit means and the locking means so as to unlock the door after a predetermined period beginning with the completion of the pressurization of the object.

15. The apparatus of claim 10 further characterized in that the enclosure includes overpressure relief means in the event of an explosion of said object, said overpressure relief means comprising small apertures in the walls of the enclosure for the passage of gas impelled by the explosive force.

16. The apparatus of claim 15 further characterized in that the enclosure is supported off the floor by supports, the overpressure relief means including apertures in the bottom wall of the enclosure.

17. The apparatus of claim 11 further characterized in that walls of the enclosure are reinforced by welded-on reinforcing bars.

18. An apparatus for relatively safely pressurizing an object with compressed gas, the apparatus comprising an enclosure that receives the object, the enclosure being sufficiently strong and securely held as to contain said object and fragments thereof in the event of an explosion within the enclosure, the enclosure having an entrance that permits the introduction of said object, said entrance having a door movable between an open position and a closed position, and locking means actuatable to lock the door in the closed position, compressed gas conduit means having a gas outlet connector that can be affixed to said object, compressed gas supply means in interruptible communication with the compressed gas conduit means, precautionary interlock means coacting with compressed gas conduit means to prevent the flow of gas from the compressed gas means to said object when the door is not in the closed position, and timed delay means coacting with said locking means and said compressed gas conduit means to lock the door in the closed position when the compressed gas is supplied to the object and to keep the door so locked for a predetermined period after pressurizing has been completed and the danger of explosion has passed.

19. The apparatus of claim 18 further characterized in that the precautionary interlock means is gas-actuated.

20. The apparatus of claim 18 further characterized in that the precautionary interlock means is located inside of the enclosure when said door is in the closed position.

21. The apparatus of claim 20 further characterized in that the gas actuating the precautionary interlock means and the gas used to pressurize said object both come from said compressed gas supply means.

22. The apparatus of claim 18 further characterized in that the precautionary interlock means comprises electrical means, and in that the compressed gas supply means includes an electrically-powered air compressor with a main electrical switch.

23. The apparatus of claim 22 further characterized in that said precautionary interlock means includes electric switch means placed on the door and on said locking means, said switch means being wired in such fashion that the door must be closed and locked for the air compressor to operate.

24. The apparatus of claim 18 further characterized in that the timed delay means is gas-actuated.

25. The apparatus of claim 24 further characterized in that the compressed gas supply means supplies the gas for the pressurization of said object, the gas to actuate the precautionary interlock means and the gas to actuate the timed delay means.

26. The apparatus of claim 18 further characterized in that the timed delay means includes electrically-actuated means, and that the compressed gas supply means includes an electrically-powered air compressor with a main electrical switch.

27. The apparatus of claim 26 further characterized in that said electrically-actuated means includes a solenoid designed to operate the locking means such that the door is locked in the closed position when the solenoid is energized, timer means electrically connected to the solenoid switch and to the air compressor main switch, connected such that the timer means begins counting a predetermined period of time upon disengagement of the air compressor main switch, and such that the timer deenergizes the solenoid at the end of said predetermined period.

28. The apparatus of claim 18 further characterized in that said predetermined period of time is about ¼ to 4 minutes.

29. The apparatus of claim 24 further characterized in that the time delay means comprises a small gas bleed, and the compressed gas conduit means is connected to the timed delay means to actuate it when the compressed gas conduit means is delivering gas to the objects to be pressurized, the gas bleed being connected to provide a slow loss of compressed gas from the timed delay means to thus unlock the locking means at a predetermined time after the object pressurization has been completed.

30. The apparatus of claim 18 further characterized in that it includes a manually-operated control connected for actuating the object pressurization, the control and the precautionary interlock means being at opposite ends of the enclosure.

31. The apparatus of claim 30 further characterized in that the manually-operated control is positioned such that it cannot be operated by a weight.

* * * * *